US012640452B2

(12) United States Patent
Lao et al.

(10) Patent No.: US 12,640,452 B2
(45) Date of Patent: May 26, 2026

(54) ELECTROCHEMICAL DEVICE INCLUDING INSULATING TAPE HAVING BODY PORTION DISPOSED ON SIDE OF ELECTRODE ASSEMBLY AND CONNECTING PORTION DISPOSED ON END OF ELECTRODE ASSEMBLY, AND ELECTRONIC DEVICE INCLUDING THE SAME

(71) Applicant: Ningde Amperex Technology Limited, Ningde (CN)

(72) Inventors: Shaojiang Lao, Ningde (CN); Shaojun Huang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 550 days.

(21) Appl. No.: 18/191,226

(22) Filed: Mar. 28, 2023

(65) Prior Publication Data

US 2023/0318159 A1 Oct. 5, 2023

(30) Foreign Application Priority Data

Mar. 30, 2022 (CN) .......................... 202210326438.3

(51) Int. Cl.
*H01M 50/593* (2021.01)
*H01M 10/0525* (2010.01)
(Continued)

(52) U.S. Cl.
CPC ..... *H01M 50/593* (2021.01); *H01M 10/0525* (2013.01); *H01M 10/0587* (2013.01);
(Continued)

(58) Field of Classification Search
CPC ............. H01M 50/593; H01M 50/586; H01M 50/538; H01M 50/595; H01M 10/0525; H01M 10/0587
(Continued)

(56) References Cited

U.S. PATENT DOCUMENTS

2004/0096735 A1 5/2004 Komatsu et al.
2018/0083311 A1* 3/2018 Kim .................. H01M 50/1243
(Continued)

FOREIGN PATENT DOCUMENTS

CN 103545559 A 1/2014
CN 103594675 A 2/2014
(Continued)

OTHER PUBLICATIONS

Office Action issued on May 10, 2022, in corresponding Chinese Patent Application No. 202210326438.3, 7 pages.
(Continued)

*Primary Examiner* — Sean P Cullen
(74) *Attorney, Agent, or Firm* — Maier & Maier, PLLC

(57) ABSTRACT

An electrochemical device includes a housing, an electrode assembly, and an insulating tape. The electrode assembly includes a first electrode plate, a second electrode plate and a separator. The insulating tape includes a body portion and a first connecting portion. The electrode assembly includes a first surface and a second surface opposite to each other. The body portion is disposed on the first surface, and is fixedly bonded to the electrode assembly and the housing separately. The first connecting portion is formed together with the body portion in one piece. A first end of the first connecting portion is connected to the body portion, and a second end of the first connecting portion is disposed on the second surface, and is fixedly bonded to the electrode (Continued)

assembly and the housing separately. The first connecting portion is bonded to an edge of the separator.

17 Claims, 7 Drawing Sheets

(51) Int. Cl.

| | |
|---|---|
| *H01M 10/0587* | (2010.01) |
| *H01M 50/538* | (2021.01) |
| *H01M 50/586* | (2021.01) |
| *H01M 50/595* | (2021.01) |

(52) U.S. Cl.
CPC ....... *H01M 50/538* (2021.01); *H01M 50/586* (2021.01); *H01M 50/595* (2021.01); *H01M 2220/30* (2013.01)

(58) Field of Classification Search
USPC ................................................. 429/163, 178
See application file for complete search history.

(56) References Cited

U.S. PATENT DOCUMENTS

| | | | |
|---|---|---|---|
| 2019/0214610 A1 | 7/2019 | Lee et al. | |
| 2020/0280043 A1 | 9/2020 | Li et al. | |
| 2022/0311105 A1* | 9/2022 | Dong | ..................... H01G 11/74 |

FOREIGN PATENT DOCUMENTS

| | | | | | | |
|---|---|---|---|---|---|---|
| CN | 107204415 | A | | 9/2017 | | |
| CN | 109244517 | A | | 1/2019 | | |
| CN | 112582753 | A | | 3/2021 | | |
| CN | 112635922 | A | * | 4/2021 | .......... | H01M 50/474 |
| CN | 113078283 | A | * | 7/2021 | ............ | H01G 11/74 |
| CN | 113097430 | A | | 7/2021 | | |
| CN | 113437444 | A | | 9/2021 | | |
| CN | 214411290 | U | | 10/2021 | | |
| CN | 113728493 | A | | 11/2021 | | |
| CN | 113745630 | A | * | 12/2021 | ........... | H01M 10/04 |
| EP | 3923406 | A2 | * | 12/2021 | .......... | H01M 50/474 |
| JP | 2017069059 | A | | 4/2017 | | |
| JP | 2019053862 | A | | 4/2019 | | |
| KR | 1020190071129 | A | | 6/2019 | | |

OTHER PUBLICATIONS

Notification to Grant issued on Jun. 2, 2022, in corresponding Chinese Patent Application No. 202210326438.3, 6 pages.
Search Report issued on Sep. 7, 2023, in corresponding European Application No. 23164416.2, 2 pages.

* cited by examiner

2

1

ELECTROCHEMICAL DEVICE INCLUDING INSULATING TAPE HAVING BODY PORTION DISPOSED ON SIDE OF ELECTRODE ASSEMBLY AND CONNECTING PORTION DISPOSED ON END OF ELECTRODE ASSEMBLY, AND ELECTRONIC DEVICE INCLUDING THE SAME

CROSS-REFERENCE TO RELATED APPLICATIONS

This application claims priority to Chinese patent application No. 202210326438.3, filed on Mar. 30, 2022 and entitled "ELECTROCHEMICAL DEVICE AND ELECTRIC DEVICE", which is incorporated herein by reference in its entirety.

TECHNICAL FIELD

This application relates to the technical field of batteries, and in particular, to an electrochemical device and an electronic device.

BACKGROUND

An electrochemical device is a device that converts external energy into electrical energy for being stored internally so that the stored electrical energy can be supplied to an external device (such as a portable electronic device) when necessary. Generally, an electrochemical device includes a housing, an electrode assembly accommodated in the housing, a tab, and an electrolytic solution. The electrode assembly includes a first electrode plate unit, a second electrode plate unit, and a separator unit that are stacked along a thickness direction of the electrode assembly. Each first electrode plate unit (or each second electrode plate unit) may be a stand-alone structure (such as a stacked structure), or may be a structure formed by winding and stacking the same electrode plate. The first electrode plate unit and the second electrode plate unit are of opposite polarities, and are separated by the separator unit in between. Generally, an edge of the separator unit is disposed beyond the edges of the first electrode plate unit and the second electrode plate unit, so as to reduce a risk of electrical contact between the first electrode plate unit and the second electrode plate unit.

In a process of working out this application, the applicant hereof finds that: when the electrochemical device is impacted by vibration or accidental dropping, the edge of the separator unit shrinks inward, thereby resulting in a possible electrical contact between the first electrode plate unit and the second electrode plate unit at an edge part and causing a short circuit of the electrode assembly.

SUMMARY

An objective of this application is to provide an electrochemical device and an electronic device to reduce the risk of short circuits of an electrode assembly.

To solve the above technical problem, this application discloses the following technical solutions:

An electrochemical device is disclosed, including a housing and an electrode assembly accommodated in the housing. The electrode assembly includes a first electrode plate unit, a second electrode plate unit, and a separator unit that are stacked along a first direction. The first electrode plate unit and the second electrode plate unit that are adjacent to each other are separated by the separator unit in between. The electrochemical device further includes an insulating tape. The insulating tape includes a body portion and a first connecting portion. The electrode assembly includes a first surface and a second surface that are disposed opposite to each other along the first direction. The body portion is disposed on the first surface. The body portion is fixedly bonded to the electrode assembly and the housing separately. The first connecting portion is formed together with the body portion in one piece. The first connecting portion includes a first end and a second end that are opposite to each other. The first end is connected to the body portion. The second end is disposed on the second surface. The second end is fixedly bonded to the electrode assembly and the housing separately. The first connecting portion is bonded to an edge of the separator unit. The first direction is a direction parallel to a thickness direction of the electrochemical device and oriented toward the second surface from the first surface.

When the edge of the separator unit, which is close to the first connecting portion, shows a tendency to shrink inward against the first electrode plate unit and the second electrode plate unit, the first connecting portion prevents the separator unit from shrinking inward or reduces the degree of inward shrinkage of the separator unit by means of a bonding force between the first connecting portion and the separator unit, thereby reducing the risk of short circuits of the electrode assembly.

In some embodiments, the electrochemical device further includes a first tab connected to the first electrode plate unit. The electrode assembly includes a first end portion and a second end portion that are opposite to each other along a second direction. The first tab is disposed at the first end portion, and the second direction is perpendicular to the first direction. The first connecting portion extends from the first surface to the second surface over the first end portion. In this way, the first connecting portion can limit, to some extent, the inward shrinkage of the edge of the separator unit which is close to the first end portion, thereby reducing the hazards of short circuits of the electrode assembly.

In some embodiments, the electrochemical device further includes a second tab connected to the second electrode plate unit, and the second tab is disposed at the first end portion. The electrochemical device satisfies at least one of the following conditions: a) along a third direction, the first connecting portion is disposed between the first tab and the second tab; b) along the third direction, the first connecting portion is disposed on a side that is of the first tab and that is away from the second tab; and c) along the third direction, the first connecting portion is disposed on a side that is of the second tab and that is away from the first tab. The third direction is perpendicular to the first direction and the second direction.

In some embodiments, one edge of at least one separator unit, located close to the first connecting portion, is bonded to the first connecting portion. In this way, when the edge of the separator unit, which is close to the first connecting portion, shows a tendency to shrink inward against the first electrode plate unit and the second electrode plate unit, the first connecting portion prevents the separator unit from shrinking inward or reduces the degree of inward shrinkage of the separator unit by means of a bonding force between the first connecting portion and the separator unit, thereby reducing the risk of short circuits of the electrode assembly.

In some embodiments, viewed along the first direction, the first electrode plate unit includes a first edge and a second edge that are disposed opposite to each other along the second direction. The first edge is located at the first end portion. The second electrode plate unit includes a third edge and a fourth edge that are disposed opposite to each other along the second direction, and the third edge is located at the first end portion. The electrochemical device satisfies at least one of the following conditions: d) an end that is of the body portion and that is close to the first end portion includes a first side located on the first surface, the first side is located on a side of the first edge and the third edge toward the second edge, a distance between a midpoint of the first side and the first edge is $L_{11}$, a distance between the midpoint of the first side and the third edge is $L_{12}$, and the distances satisfy max $(L_{11}, L_{12}) \geq 3$ mm; and e) an end that is of the body portion and that is close to the second end portion includes a second side located on the first surface, the second side is located on a side of the second edge and the fourth edge toward the first edge, a distance between a midpoint of the second side and the second edge is $L_{21}$, a distance between the midpoint of the second side and the fourth edge is $L_{22}$, and the distances satisfy max $(L_{21}, L_{22}) \geq 3$ mm. Among the first electrode plate unit and the second electrode plate unit, the one with an edge closer to the outside dangles from the other at the end portion. This means that, the first side of the insulating tape is prone to wobble if exceeding the edges of the first electrode plate unit and the second electrode plate unit. The wobble results in a stress between the edge of the insulating tape and the surface of the electrode assembly, and in turn, impairs the effect of fixing between the insulating tape and the electrode assembly. The above settings aim to prevent the first side and the second side from exceeding, in the second direction Y, the first electrode plate unit or the second electrode plate unit, whichever is closer to the outside, so as to overcome the above disadvantage.

In some embodiments, viewed along the first direction, an edge profile of the electrode assembly includes a fifth edge and a sixth edge that are disposed opposite to each other along a third direction. The fifth edge is closer to the first tab than the sixth edge along the third direction, and the third direction is perpendicular to the first direction and the second direction. The electrochemical device satisfies at least one of the following conditions: f) an end that is of the body portion and that is close to the fifth edge includes a third side located on the first surface, a distance between a midpoint of the third side and the fifth edge is $L_{33}$, and $L_{33}$ is greater than or equal to 3 mm; and g) an end that is of the body portion and that is close to the sixth edge includes a fourth side located on the first surface, a distance between a midpoint of the fourth side and the sixth edge is $L_{44}$, and $L_{44}$ is greater than or equal to 3 mm. Along the third direction, the width of a curved part of the electrode assembly is mostly within 2.5 mm. The above settings aim to prevent the edge of the body portion from adhering to the curved part on a side of the electrode assembly or from dangling from the curved part. For example, when the edge of the body portion adheres to the curved part, the edge of the body portion exerts a stress of warping away from the curved part, thereby being prone to impair the bonding strength between the insulating tape and the electrode assembly. Similarly, when the edge of the body portion dangles from the curved part, the edge of the body portion is also prone to warp, thereby impairing the bonding strength between the insulating tape and the electrode assembly.

In some embodiments, viewed along a direction opposite to the first direction, the first electrode plate unit includes a first edge and a second edge that are disposed opposite to each other along the second direction. The first edge is located at the first end portion. The second electrode plate unit includes a third edge and a fourth edge that are disposed opposite to each other along the second direction. The third edge is located at the first end portion. an end that is of the first connecting portion and that is away from the body portion includes a fifth end edge aligned with the first edge, a distance between a midpoint of the fifth end edge and the first edge is $L_{51}$, a distance between the midpoint of the fifth end edge and the third edge is $L_{52}$, and the distances satisfy max $(L_{51}, L_{52}) \geq 3$ mm. This setting aims to make the second end be long enough on the second surface, so as to ensure favorable bonding strength between the first connecting portion and the electrode assembly.

In some embodiments, the insulating tape further includes a second connecting portion formed together with the body portion in one piece. The second connecting portion includes a third end and a fourth end that are opposite to each other. The third end is connected to the body portion. The fourth end is disposed on the second surface. The fourth end is fixedly bonded to the electrode assembly and the housing separately. The second connecting portion is bonded to the edge of the separator unit. The second connecting portion extends from the first surface to the second surface over the second end portion. In this way, the hazard of looseness of the electrode assembly is reduced, and the effect of the fixing between the electrode assembly and the housing is further enhanced.

In some embodiments, the insulating tape includes a plurality of second connecting portions, and the second connecting portions are spaced out along a third direction. The third direction is perpendicular to the first direction and the second direction.

In some embodiments, along the second direction, the separator unit is disposed beyond the first electrode plate unit and the second electrode plate unit. The first tab includes at least two first conductive portions and a conductive first extension portion. The first electrode plate unit includes a first current collector unit, the first conductive portions are formed together with the first current collector unit in one piece, one end of each of the first conductive portions is connected to the first current collector unit, and the other ends of all the first conductive portions are stacked to form a first collection portion. A conductive first extension portion, where one end of the first extension portion is connected to the first collection portion, and the other end of the first extension portion extends out of the housing. The thickness of the first conductive portion in the first tab is the same as that of the first current collector unit. The first conductive portion is relatively thin and relatively sharp at the edge. Therefore, the first conductive portion is prone to movement relative to the electrode assembly and friction against the separator unit. The friction may puncture the separator unit and cause a short circuit of the electrode assembly. A part of the first connecting portion permeates into the space between adjacent separator units during the preparation, thereby preventing the wobble of the first conductive portion to some extent and reducing the short-circuit risk.

In some embodiments, the electrode assembly includes a first electrode plate, a second electrode plate, and a separator that are stacked. The electrode assembly is formed by winding. The first electrode plate and the second electrode plate are separated by the separator in between, and the electrode assembly is wound so that: the first electrode plate includes a plurality of the first electrode plate units and a plurality of first connecting units; viewed along the second direction, the first electrode plate units extend along a third direction, and all the first electrode plate units are arranged along the first direction; and, along a winding direction of the electrode assembly, each of the first connecting units connects two adjacent first electrode plate units; the second electrode plate includes a plurality of the second electrode plate units and a plurality of second connecting units; viewed along the second direction, the second electrode plate units extend along the third direction, and all the second electrode plate units are arranged along the first direction; and, along the winding direction of the electrode assembly, each of the second connecting units connects two adjacent second electrode plate units; the separator includes a plurality of the separator units and a plurality of third connecting units; viewed along the second direction, the separator units extend along the third direction, and all the separator units are arranged along the first direction; and, along the winding direction of the electrode assembly, each of the third connecting units connects two adjacent separator units. The third direction is perpendicular to the first direction and the second direction. In this way, the first electrode plate, the second electrode plate, and the separator are wound to form the first electrode plate units, the second electrode plate units, and the separator units.

In some embodiments, the insulating tape includes a hot-melt adhesive.

In some embodiments, the insulating tape includes a substrate layer, a first hot-melt material layer, and a second hot-melt material layer. The first hot-melt material layer is disposed on a side that is of the substrate layer and that is oriented toward the electrode assembly. The first hot-melt material layer is configured to melt when a temperature is higher than a preset threshold, so as to be bonded to the electrode assembly. The second hot-melt material layer is disposed on a side that is of the substrate layer and that is oriented away from the electrode assembly. The second hot-melt material layer is configured to melt when the temperature is higher than a preset threshold, so as to be bonded to the housing.

In some embodiments, at least a part of the first connecting portion is interposed between two adjacent separator units to fixedly bond the two adjacent separator units. Therefore, when a separator unit shows a tendency to shrink, the separator unit fixedly bonded to same can limit the degree of shrinkage of same to some extent, thereby alleviating the short-circuit risk caused by the shrinkage of the separator unit of the electrochemical device.

To solve the above technical problem, this application further discloses the following technical solution:

An electronic device is disclosed, including the electrochemical device described above. Due to inclusion of the electrochemical device, the electronic device can also reduce the risk of short circuits of the electrode assembly in the electronic device.

BRIEF DESCRIPTION OF DRAWINGS

To describe the technical solutions in some embodiments of this application more clearly, the following outlines the drawings to be used in the description of some embodiments. Evidently, the drawings outlined below are merely a part of embodiments of this application. A person of ordinary skill in the art may derive other drawings from the illustrated structure without making any creative effort.

DETAILED DESCRIPTION

For ease of understanding this application, the following describes this application in more detail with reference to drawings and specific embodiments. It is hereby noted that an element referred to herein as being "fixed to" or "fastened to" another element may be directly disposed on the other element, or may be fixed or fastened to the other element with one or more elements in between. An element referred to herein as "connected to" another element may be connected to the other element directly or with one or more elements in between. The terms "vertical", "horizontal", "left", "right", "in", "out" and other similar expressions used herein are merely for ease of description.

Unless otherwise defined, all technical and scientific terms used herein bear the same meanings as what is normally understood by a person skilled in the technical field of this application. The terms used in the specification of this application are merely intended to describe specific embodiments but not to limit this application. The term "and/or" used herein is intended to include any and all combinations of one or more relevant items enumerated.

In addition, to the extent that no mutual conflict occurs, the technical features described below in different embodiments of this application may be combined with each other.

In this specification, the meanings of "mounting" or "installation" include fixing or confining an element or unit to a specific position or place by welding/soldering, screwing, snap-fit connection, bonding, or other means, where the element or unit may be held stationary in the specific position or place or may move within a limited range, and the element or unit may be detachable or undetachable after being fixed or confined to the specific position or place, without being limited in embodiments of this application.

Figure 1:
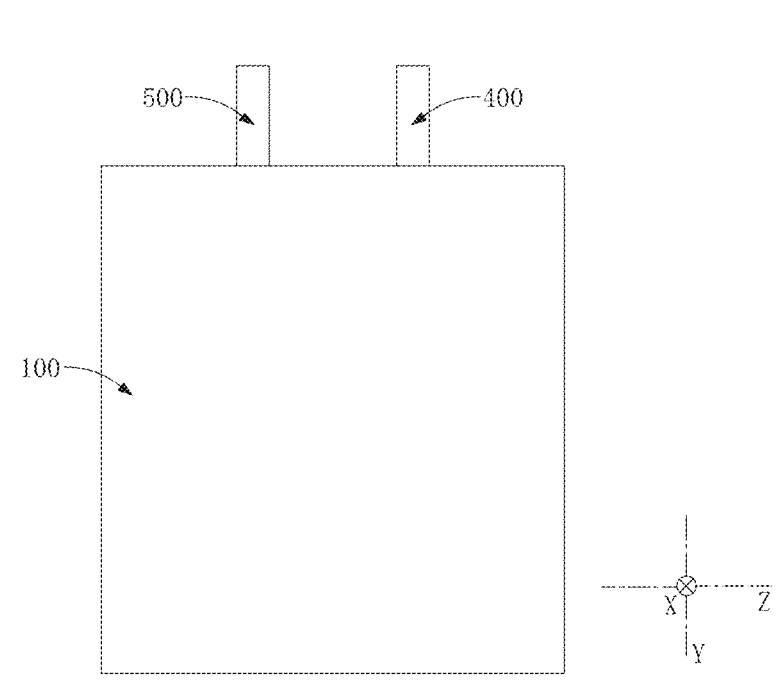
FIG. 1 is a schematic diagram of an electrochemical device according to an embodiment of this application.
Figure 2:
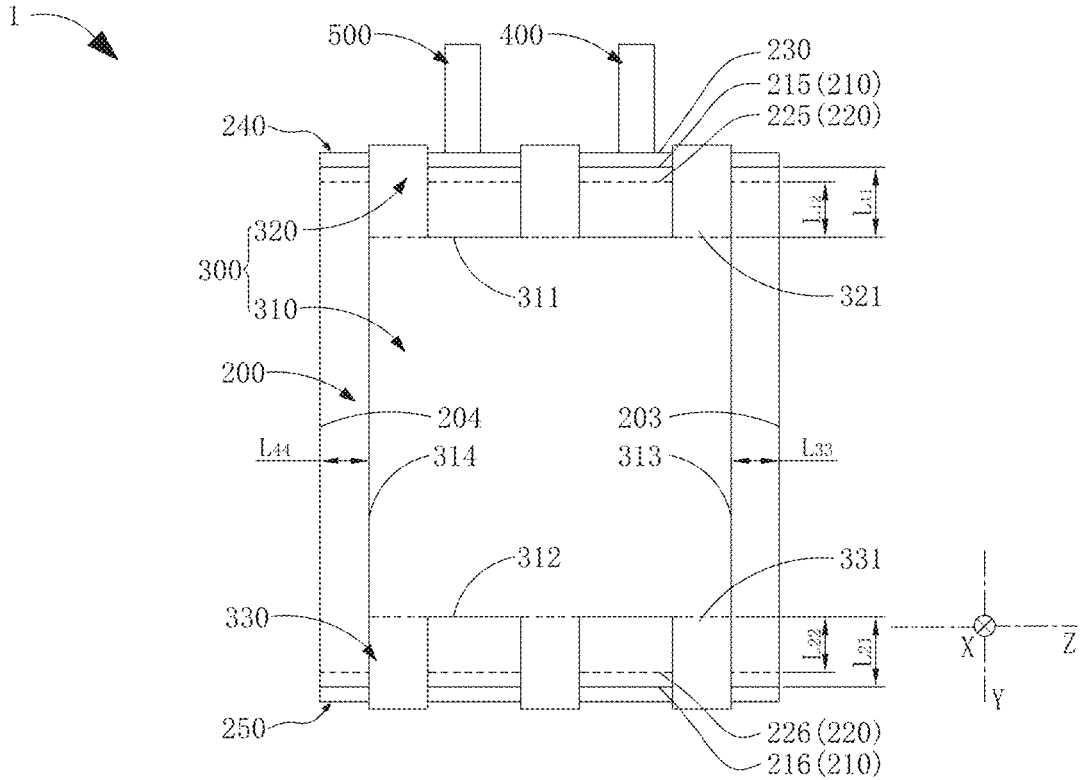
FIG. 2 is a schematic diagram of the electrochemical device shown in FIG. 1 with a housing unshown as viewed along a first direction.

Refer to FIG. 1 to FIG. 4, which are a schematic diagram of an electrochemical device 1 according to an embodiment of this application; a schematic diagram of the electrochemical device 1 with a housing 100 unshown as viewed along a first direction X; a schematic diagram of the electrochemical device 1 with a housing 100 unshown as viewed in a direction opposite to the first direction X; and a top view of FIG. 2, respectively. The electrochemical device 1 includes a housing 100, an electrode assembly 200, and an insulating tape 300. The housing 100 is a mounting base of the electrochemical device 1. The electrode assembly 200 is accommodated in the housing 100, and includes a first electrode plate unit 211, a second electrode plate unit 221, and a separator unit 231 that are stacked along the first direction X shown in FIG. 4. The first electrode plate unit 211 and the second electrode plate unit 221 that are adjacent to each other are separated by the separator unit 231 in between. The electrode assembly 200 includes a first surface 201 and a second surface 202 that are disposed opposite to each other along the first direction X. The insulating tape 300 includes a body portion 310 and a first connecting portion 320. The body portion 310 is disposed on the first surface 201, and is fixedly bonded to the electrode assembly 200 and the housing 100 separately. The first connecting portion 320 includes a first end 321 and a second end 322 that are opposite to each other. The first end 321 is connected to the body portion 310. The second end 322 is disposed on the second surface 202. The first connecting portion 320 is bonded to an edge of at least one separator unit 231. The following describes the specific structure of the electrochemical device 1 by using a lithium-ion cell as an example of the electrochemical device 1.

With respect to the housing 100, referring to FIG. 1, the housing 100 is of a fairly flat box structure, and contains an accommodation cavity (not shown) configured to accommodate the electrode assembly 200, the insulating tape 300, and an electrolytic solution. In this embodiment, the electrochemical device 1 is a pouch-type battery. Correspondingly, the housing 100 is made of a flexible sheet such as an aluminum plastic film. Definitely, in other embodiments of this application, the electrochemical device 1 may be a hard-shell battery such as a steel-shell battery, an aluminum-shell battery, or a polymer hard-shell battery. In addition, in other embodiments of this application, the housing 100 may be in other shapes such as a block shape or a column shape, without being limited herein.

Figure 3:
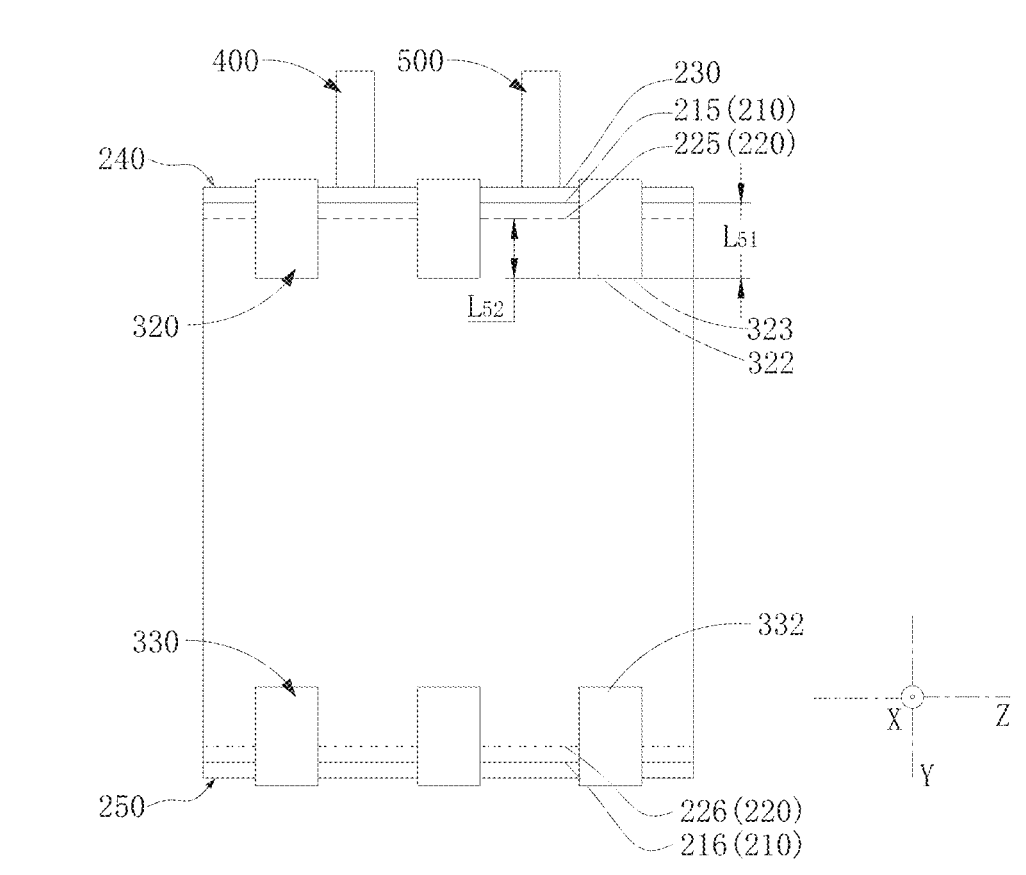
FIG. 3 is a schematic diagram of the electrochemical device shown in FIG. 1 with a housing unshown as viewed in a direction opposite to a first direction.
Figure 4:
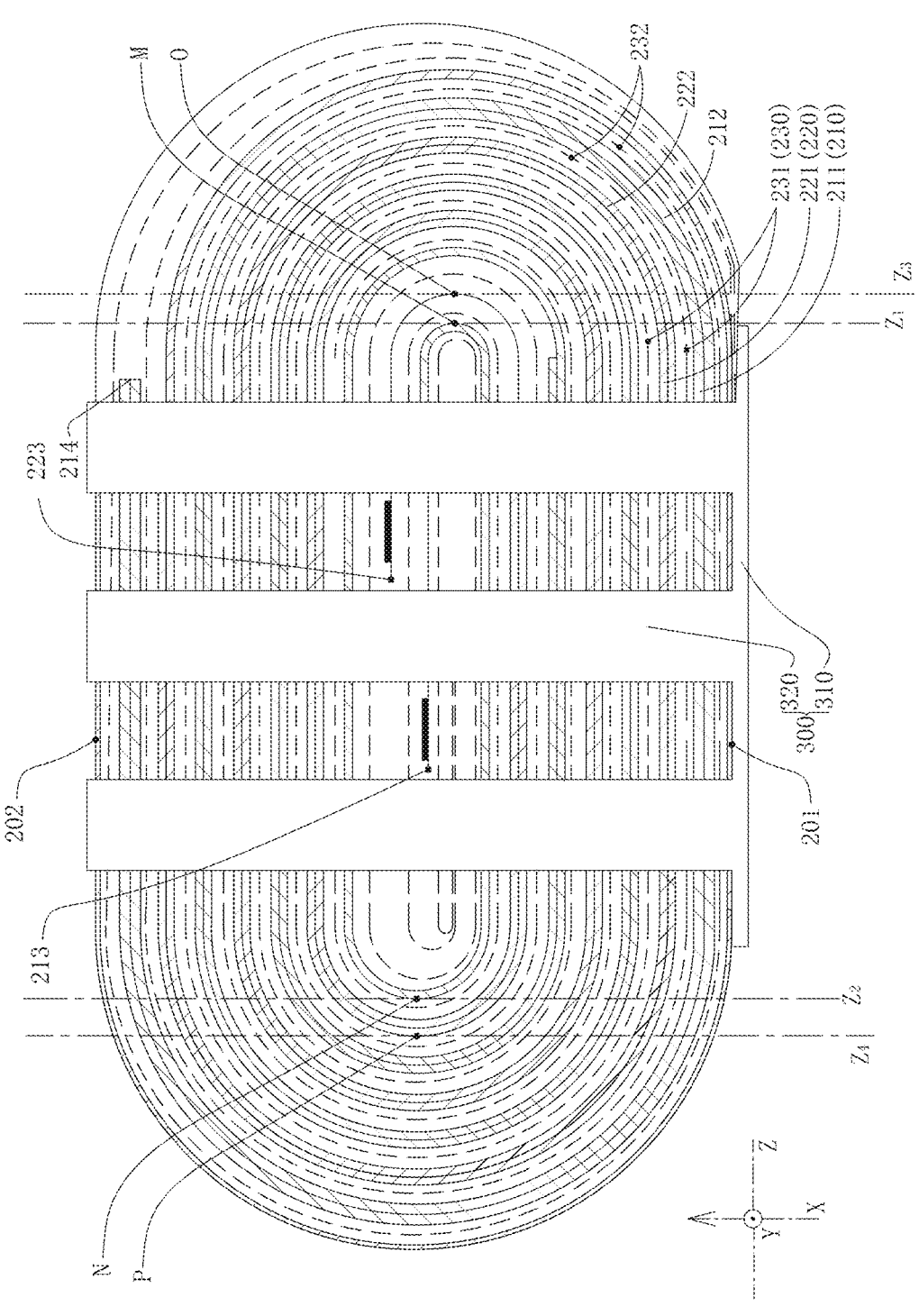
FIG. 4 is a top view of FIG. 2.

With respect to the electrode assembly 200, referring to FIG. 4 together with FIG. 2 and FIG. 3, the electrode assembly 200 is a core part of the electrochemical device 1, and includes a first electrode plate unit 211, a second electrode plate unit 221, and a separator unit 231 that are stacked along the first direction X. The first electrode plate unit 211 and the second electrode plate unit 221 are of opposite polarities, and are separated by the separator unit 231 in between. Along a thickness direction of the electrochemical device 1, the electrode assembly 200 includes a first surface 201 and a second surface 202 that are disposed opposite to each other. For ease of description, the direction oriented toward the second surface 202 from the first surface 201 is herein referred to as the first direction X. In other words, the "first direction" in this application means a direction parallel to the thickness direction of the electrochemical device 1 and oriented toward the second surface 202 from the first surface 201.

In this embodiment, the electrode assembly 200 is a jelly-roll structure. Specifically, the electrode assembly 200 includes a first electrode plate 210, a second electrode plate 220, and a separator 230. The first electrode plate 210 and the second electrode plate 220 are of opposite polarities, and are separated by the separator 230 in between. The electrode assembly 200 is formed by winding so that the first electrode plate 210, the second electrode plate 220, and the separator 230 are bent several times, and are stacked in layers in the first direction X to form the first electrode plate unit 211, the second electrode plate unit 221, and the separator unit 231 that are stacked together.

Still referring to FIG. 4, the first electrode plate 210 includes a first end edge 213 and a second end edge 214 disposed opposite to each other along the winding direction. The first end edge 213 is located at a winding center of the electrode assembly 200. The second end edge 214 is located at an end that is of the first electrode plate 210 and that is away from the first end edge 213. The first electrode plate 210 is wound around the first end edge 213. When viewed along the second direction Y shown in FIG. 4, at a first corner along the winding direction of the electrode assembly 200 starting from the first end edge 213 of the first electrode plate 210, an outermost point along the third direction Z is denoted as a first point M, and a straight line that is drawn parallel to the first direction X benchmarked against the first point M is defined as a first base line $Z_1$. When viewed along the second direction Y, at a second corner along the winding direction of the electrode assembly 200 starting from the first end edge 213 of the first electrode plate 210, an outermost point along the third direction Z is denoted as a second point N, and a straight line that is drawn parallel to the first direction X benchmarked against the second point N is defined as a second base line $Z_2$. It is hereby noted that the "second direction" referred to herein is an extension direction of the first end edge 213, and the "third direction" referred to herein is perpendicular to the first direction X and the second direction Y. Correspondingly, the electrode assembly 200 includes a first end portion 240 and a second end portion 250 that are disposed opposite to each other along the second direction Y, as shown in FIG. 2 and FIG. 3.

The first electrode plate 210 is wound to form a plurality of first electrode plate units 211 and a plurality of first connecting units 212. Viewed along the second direction Y, each first electrode plate unit 211 is located between the first base line $Z_1$ and the second base line $Z_2$, and extends along the third direction Z. The first electrode plate units 211 are disposed sequentially along the first direction X. With reference to FIG. 2 and FIG. 3, each first electrode plate unit 211 includes a first edge 215 and a second edge 216 that are disposed opposite to each other along the second direction Y. The first edge 215 is located at the first end portion 240, and the second edge 216 is located at the second end portion 250. Viewed along the second direction Y, each first connecting unit 212 is located outside a range defined by the first base line $Z_1$ and the second base line $Z_2$. Along the winding direction of the first electrode plate 210, the first connecting unit 212 is located between two adjacent first electrode plate units 211 to connect the two adjacent first electrode plate units 211.

Still referring to FIG. 4, the second electrode plate 220 includes a third end edge 223 and a fourth end edge disposed opposite to each other along the winding direction. The second electrode plate 220 is wound around the third end edge 223, and the fourth end edge is located at an end that is of the second electrode plate 220 and that is away from the third end edge 223. When viewed along the second direction Y, at a first corner along the winding direction of the electrode assembly 200 starting from the third end edge 223 of the second electrode plate 220, an outermost point along the third direction Z is denoted as a third point O, and a straight line that is drawn parallel to the first direction X benchmarked against the third point O is defined as a third base line $Z_3$. At a second corner along the winding direction of the electrode assembly 200 starting from the third end edge 223 of the second electrode plate 220, an outermost point along the third direction Z is denoted as a fourth point P, and a straight line that is drawn parallel to the first direction X benchmarked against the fourth point P is defined as a fourth base line $Z_4$.

The second electrode plate 220 is wound to form a plurality of second electrode plate units 221 and a plurality of second connecting units 222. Viewed along the second direction Y, each second electrode plate unit 221 is located between the third base line $Z_3$ and the fourth base line $Z_4$, and extends along the third direction Z. The second electrode plate units 221 are disposed sequentially along the first direction X. With reference to FIG. 2 and FIG. 3, the second electrode plate unit 221 includes a third edge 225 and a fourth edge 226 that are disposed opposite to each other along the second direction Y. The third edge 225 is located at the first end portion 240, and the fourth edge 226 is located at the second end portion 250. Viewed along the second direction Y, each second connecting unit 222 is located outside a range defined by the third base line $Z_3$ and the fourth base line $Z_4$. Along the winding direction of the second electrode plate 220, the second connecting unit 222 is located between two adjacent second electrode plate units 221 to connect the two adjacent second electrode plate units 221.

Still referring to FIG. 4, the separator 230 is wound to form a plurality of separator units 231 and a plurality of third connecting units 232. Viewed along the second direction Y, each separator unit 231 is located between the first base line $Z_1$ and the second base line $Z_2$, and extends along the third direction Z. Each separator units 231 are disposed sequentially along the first direction X. Viewed along the second direction Y, each third connecting unit 232 is located outside a range defined by the third base line $Z_3$ and the fourth base line $Z_4$. Along the winding direction of the separator 230, the third connecting unit 232 is located between two adjacent separator units 231 to connect the two adjacent separator units 231. Along the second direction Y, both edges of the separator 230 exceed the first electrode plate 210 and the second electrode plate 220, thereby preventing the first electrode plate 210 and the second electrode plate 220 from contacting each other at the edge part. Specifically, referring to FIG. 2 and FIG. 3, along the second direction Y, the two edges of each separator unit 231 exceed the first electrode plate unit 211 and the second electrode plate unit 221. Two edges of the third connecting unit 232 exceed the first connecting unit 212 and the second connecting unit 222.

With respect to the insulating tape 300, referring to FIG. 2 and FIG. 3 together with FIG. 4, the insulating tape 300 is fixed to both the electrode assembly 200 and the housing 100, so as to fix the electrode assembly 200 to the housing 100. Specifically, the insulating tape 300 includes a body portion 310 and a first connecting portion 320. The body portion 310 is disposed on the first surface 201, and is fixedly bonded to the electrode assembly 200 and the housing 100 separately. One end of the first connecting portion 320 is connected to the body portion 310, and the other end passes over the electrode assembly 200 along the first direction X, and is fixed onto the second surface 202. The following describes the body portion 310 and the first connecting portion 320 in detail.

Referring to FIG. 2, the body portion 310 in this embodiment is roughly rectangular, and includes a first side 311, a second side 312, a third side 313, and a fourth side 314 that are located on the first surface 201. The first side 311 and the second side 312 are disposed opposite to each other along the second direction Y. The first side 311 is located at an end that is of the body portion 310 and that is close to the first end portion 240, and located on a side of the first edge 215 and the third edge 225 opposite to the second edge 216, and is roughly parallel to the first edge 215 and the third edge 225. The second side 312 is located at an end that is of the body portion 310 and that is away from the first end portion 240, and located on a side of the second edge 216 and the fourth edge 226 opposite to the first edge 215, and is roughly parallel to the second edge 216 and the fourth edge 226. Viewed along the first direction X, an edge profile of the electrode assembly 200 includes a fifth edge 203 and a sixth edge 204 that are opposite to each other along a third direction Z. The fifth edge 203 is closer to the first base line $Z_1$ and the first point M than the sixth edge 204 along the third direction Z. The third side 313 and the fourth side 314 are disposed opposite to each other along the third direction Z. The third side 313 is closer to the fifth edge 203 than the fourth side 314. The fourth side 314 is located on a side that is of the third side 313 and that is away from the fifth edge 203.

Optionally, the electrochemical device 1 satisfies: max $(L_1, L_{12}) \geq 3$ mm, where $L_{11}$ is a distance between a midpoint of the first side 311 and the first edge 215, and $L_{12}$ is a distance between the midpoint of the first side 311 and the third edge 225. Among the first electrode plate unit 211 and the second electrode plate unit 221, the one with an edge closer to the outside dangles from the other at the end portion. This means that, the first side 311 of the insulating tape 300 is prone to wobble if exceeding the edges of the first electrode plate unit 211 and the second electrode plate unit 221. The wobble results in a stress between the edge of the insulating tape 300 and the surface of the electrode assembly 200, and in turn, impairs the effect of fixing between the insulating tape 300 and the electrode assembly 200. The above settings aim to prevent the first side 311 from exceeding, in the second direction Y, the first electrode plate unit 211 or the second electrode plate unit 221, whichever is closer to the outside, so as to overcome the above disadvantage. In addition, when the insulating tape 300 includes a hot-melt component, the above settings favorably enable the body portion 310 to substantially remain on the first surface 201 after being fixed through hot melting, so as to ensure relatively high bonding strength between the insulating tape 300 and the electrode assembly 200.

Optionally, the electrochemical device 1 satisfies: max $(L_{21}, L_{22}) \geq 3$ mm, where $L_{21}$ is a distance between a midpoint of the second side 312 and the second edge 216, and $L_{22}$ is a distance between the midpoint of the second side 312 and the fourth edge 226. Among the first electrode plate unit 211 and the second electrode plate unit 221, the one with an edge closer to the outside dangles from the other at the end portion. This means that, the second side 312 of the insulating tape 300 is prone to wobble if exceeding the edges of the first electrode plate unit 211 and the second electrode plate unit 221. The wobble results in a stress between the edge of the insulating tape 300 and the surface of the electrode assembly 200, and in turn, impairs the effect of fixing between the insulating tape 300 and the electrode assembly 200. The above settings aim to prevent the second side 312 from exceeding, in the second direction Y, the first electrode plate unit 211 or the second electrode plate unit 221, whichever is closer to the outside, so as to overcome the above disadvantage. In addition, when the insulating tape

300 includes a hot-melt component, the above settings favorably enable the body portion 310 to substantially remain on the first surface 201 after being fixed through hot melting, so as to ensure relatively high bonding strength between the insulating tape 300 and the electrode assembly 200.

Further optionally, the electrochemical device 1 satisfies: $L_{33} \geq 3$ mm and/or $L_{44} \geq 3$ mm, where $L_{33}$ is a distance between a midpoint of the third side 313 and the fifth edge 203, and Lu is a distance between a midpoint of the fourth side 314 and the sixth edge 204. Along the third direction, the width of a curved part of the electrode assembly 200 is mostly within 2.5 mm. The above settings aim to prevent the edge of the body portion 310 from adhering to the curved part on a side of the electrode assembly 200 or from dangling from the curved part. For example, when the edge of the body portion 310 adheres to the curved part, the edge of the body portion 310 exerts a stress of warping away from the curved part, thereby being prone to impair the bonding strength between the insulating tape 300 and the electrode assembly 200. Similarly, when the edge of the body portion 310 dangles from the curved part, the edge of the body portion 310 is also prone to warp, thereby impairing the bonding strength between the insulating tape 300 and the electrode assembly 200.

Still referring to FIG. 2 and FIG. 3, the first connecting portion 320 is in a strip shape, and includes a first end 321 and a second end 322 that are opposite to each other along the extension direction of the first connecting portion. The first end 321 is connected to the body portion 310. The second end 322 extends to the second surface 202 over the first end portion 240 of the electrode assembly 200, and is fixed to the second surface 202. The first connecting portion 320 is in a tensioned state to enable the insulating tape 300 to clamp the first end portion 240 of the electrode assembly 200, thereby reducing the risk of looseness of the electrode assembly 200.

When the electrochemical device 1 drops or is impacted by an external force, the separator unit 231 may shrink against the first electrode plate unit 211 and the second electrode plate unit 221. The shrinkage may cause a contact and short circuit between the first electrode plate unit 211 and the second electrode plate unit 221. Preferably, one edge of at least one separator unit 231, located close to the first connecting portion 320, is bonded to the first connecting portion 320. In this way, when the edge of the separator 230, which is close to the first connecting portion 320, shows a tendency to shrink inward against the first electrode plate 210 and the second electrode plate 220, the first connecting portion 320 prevents the separator 230 from shrinking inward or reduces the degree of inward shrinkage of the separator 230 by means of a bonding force between the first connecting portion and the separator 230, thereby reducing the risk of short circuits of the electrochemical device 1. Further, the first connecting portion 320 is fixedly bonded to the electrode assembly 200 and the housing 100 separately, thereby enhancing the effect of fixing between the electrode assembly 200 and the housing 100.

A fifth end edge 323 exists at an end that is of the first connecting portion 320 and that is away from the body portion 310, and is aligned with and roughly parallel to the first edge 215 and the third edge 225. Optionally, the electrochemical device 1 satisfies: max $(L_{51}, L_{52}) \geq 3$ mm, where $L_{51}$ is a distance between a midpoint of the fifth end edge 323 and the first edge 215, and $L_{52}$ is a distance between the midpoint of the fifth end edge 323 and the third edge 225. This setting aims to make the second end 322 be long enough on the second surface 202, so as to ensure favorable bonding strength between the first connecting portion 320 and the electrode assembly 200.

In this embodiment, the first connecting portion 320 and the body portion 310 are formed in one piece. Therefore, during manufacture of the electrochemical device 1, an adhesive applicator can fix the electrode assembly 200 to the housing 100 by applying the insulating tape to the electrode assembly 200 for just one time, and the shrinkage of the separator unit 231 is alleviated, thereby enhancing the efficiency of the gluing process and enhancing the production efficiency of the electrochemical device 1. Understandably, in other embodiments of this application, the first connecting portion 320 may be formed independently of the body portion 310 instead.

To further reduce the hazard of looseness of the electrode assembly 200, the insulating tape 300 further includes a second connecting portion 330 formed together with the body portion 310 in one piece. Specifically, still referring to FIG. 2 and FIG. 3, the second connecting portion 330 is in a strip shape, and includes a third end 331 and a fourth end 332 that are opposite to each other along the extension direction of the second connecting portion. The third end 331 is connected to the body portion 310. The fourth end 332 extends to the second surface 202 over the second end portion 250 of the electrode assembly 200, and is fixed to the second surface 202. The second connecting portion 330 is in a tensioned state to enable the insulating tape 300 to clamp the second end portion of the electrode assembly 200, thereby reducing the risk of looseness of the electrode assembly 200. Preferably, one edge of at least one separator unit 231, located close to the second connecting portion 330, is bonded to the second connecting portion 330. In this way, when the edge of the separator 230, which is close to the second connecting portion 330, shows a tendency to shrink inward against the first electrode plate 210 and the second electrode plate 220, the second connecting portion 330 prevents the separator unit 231 from shrinking inward or reduces the degree of inward shrinkage of the separator unit 231 by means of a bonding force between the second connecting portion and the separator unit 231, thereby reducing the risk of short circuits of the electrochemical device 1. Further, the second connecting portion 330 is fixedly bonded to the electrode assembly 200 and the housing 100 separately, thereby enhancing the effect of fixing between the electrode assembly 200 and the housing 100. In this embodiment, the insulating tape 300 includes a plurality of second connecting portions 330. The second connecting portions 330 are spaced out along the third direction Z. Understandably, in other embodiments of this application, the insulating tape 300 may include just one second connecting portion 330, the number of which is not limited herein.

Figure 5:
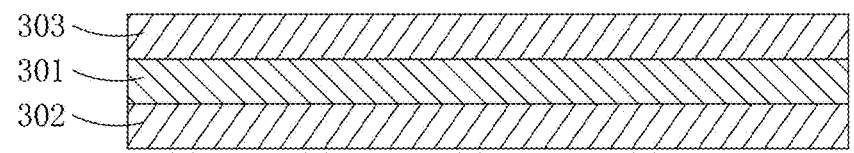
FIG. 5 is a schematic sectional view of an insulating tape.

In this embodiment, the insulating tape 300 includes a hot-melt adhesive. Specifically, referring to FIG. 5, which is a schematic sectional view of the insulating tape 300, the insulating tape 300 includes a substrate layer 301, a first hot-melt material layer 302, and a second hot-melt material layer 303. The substrate layer 301 is a base material layer for carrying the first hot-melt material layer 302 and the second hot-melt material layer 303, and includes a main region located in the body portion 310, a first connecting region located in the first connecting portion 320, and a second connecting region located in the second connecting portion 330. Optionally, the substrate layer 301 includes polyester resin. Definitely, in other embodiments of this application, the substrate layer 301 may include other polymer materials.

The first hot-melt material layer 302 is disposed on a side that is of the substrate layer 301 and that is oriented toward the electrode assembly 200, that is, a side that is of the main region and the first connecting region and that is oriented toward the electrode assembly 200, and is configured to melt when a temperature is higher than a preset threshold, so as to be bonded to the electrode assembly 200. The first hot-melt material layer 302 is of relatively low adhesiveness at a normal temperature (20° C. to 30° C.). During manufacture of the electrochemical device 1, the insulating tape 300 is elementarily bonded onto the surface of the electrode assembly 200 by means of the adhesiveness of the first hot-melt material layer 302 under normal-temperature conditions.

Subsequently, a temperature higher than the preset threshold is applied to the electrochemical device 1 through chemical formation or other processes, so as to melt the first hot-melt material layer 302. After being cooled, the insulating tape 300 is fixed to the electrode assembly 200 to exert relatively high bonding strength. Optionally, the first hot-melt material layer 302 includes an amorphous α-olefin copolymer, poly(styrene-block-isoprene-block-styrene), and a thickener. For example, in some embodiments, a mass percent of the amorphous α-olefin copolymer in the first hot-melt material layer 302 is 30% to 40%; a mass percent of the poly(styrene-block-isoprene-block-styrene) in the first hot-melt material layer 302 is 50% to 60%; and a mass percent of the thickener in the first hot-melt material layer 302 is 5% to 8%. Definitely, in other embodiments of this application, the first hot-melt material layer 302 may include other thermoplastic resins such as poly(ethylene-co-vinyl acetate), polyamide, polyester amide, and polyethylene.

The second hot-melt material layer 303 is disposed on a side that is of the substrate layer 301 and that is oriented away from the electrode assembly 200, that is, a side that is of the main region and the first connecting region and that is oriented away from the electrode assembly 200, and is configured to melt when the temperature is higher than a preset threshold, so as to be bonded to an inner wall of the housing 100. The second hot-melt material layer 303 is of relatively low adhesiveness at a normal temperature (20° C. to 30° C.). During manufacture of the electrochemical device 1, the insulating tape 300 elementarily bonds the electrode assembly 200 to the housing 100 by means of the adhesiveness of the first hot-melt material layer 302 under normal-temperature conditions. Subsequently, a temperature higher than the preset threshold is applied to the electrochemical device 1 through chemical formation or other processes, so as to melt the second hot-melt material layer 303. After being cooled, the insulating tape 300 is fixed to the housing 100 to exert relatively high bonding strength. Optionally, the second hot-melt material layer 303 includes an amorphous α-olefin copolymer, poly(styrene-block-isoprene-block-styrene), and a thickener. For example, in some embodiments, a mass percent of the amorphous α-olefin copolymer in the first hot-melt material layer 302 is 30% to 40%; a mass percent of the poly(styrene-block-isoprene-block-styrene) in the first hot-melt material layer 302 is 50% to 60%; and a mass percent of the thickener in the first hot-melt material layer 302 is 5% to 8%. Definitely, in other embodiments of this application, the first hot-melt material layer 302 may include other thermoplastic resins such as poly(ethylene-co-vinyl acetate), polyamide, polyester amide, and polyethylene. It is noted that the "preset threshold" herein means a temperature at which the first hot-melt material layer 302 starts melting after being heated. The preset threshold is higher than a normal operating temperature of the electrochemical device 1, and ensures that the first hot-melt material layer 302 remains in a solid state when the electrochemical device 1 is in a normal state (that is, not thermally runaway).

Understandably, even though the insulating tape 300 in this embodiment includes a hot-melt adhesive and the hot-melt adhesive further includes the substrate layer 301 and the hot-melt material layer disposed on both sides of the substrate layer, this application is not limited to such configuration of the insulating tape. For example, in some other embodiments of this application, a side that is of the insulating tape 300 and that is oriented toward the electrode assembly 200 may be a conventional adhesive layer that is adhesive to some extent at a normal temperature. However, by contrast, the hot-melt adhesive configuration adopted in this embodiment of this application enables the first hot-melt material layer 302 to flow and interspace two adjacent separator units 231 during the subsequent hot melting, so as to fixedly bond the two adjacent separator units 231. Therefore, when a separator unit 231 shows a tendency to shrink, the separator unit 231 fixedly bonded to same can limit the degree of shrinkage of same to some extent, thereby alleviating the short-circuit risk caused by the shrinkage of the separator unit 231 of the electrochemical device 1. As another example, in some other embodiments of this application, the insulating tape 300 does not include the substrate layer 301, and the first hot-melt material layer 302 and the second hot-melt material layer 303 are formed in one piece. As another example, in still some other embodiments of this application, the insulating tape 300 is a conventional double-sided tape. Specifically, the insulating tape 300 includes a substrate layer, a first adhesive layer disposed on one side of the substrate layer, and a second adhesive layer disposed on the other side of the substrate layer. The insulating tape 300 is fixed to the electrode assembly 200 by the first adhesive layer, and fixed to the housing 100 by the second adhesive layer.

Further, the electrochemical device 1 includes a first tab 400 and a second tab 500. Specifically, referring to FIG. 2 and FIG. 3, the first tab 400 is disposed at the first end portion 240, and is connected to the first electrode plate unit 211. One end of the first tab extends out of the housing 100 away from the second end portion 250 to form a conductive terminal of the electrochemical device 1. As can be seen from the description above, the second direction Y is also a direction defined by connecting one end of the electrode assembly 200 to the other end, where the one end is close to the first tab 400 and the other end is away from the first tab 400. Along the third direction Z, a distance between the first tab 400 and the fifth edge 203 is less than a distance between the first tab and the sixth edge 204. That is, the fifth edge 203 is closer to the first tab 400 than the sixth edge 204.

The second tab 500 is also disposed at the first end portion 240. Along the third direction Z shown in the drawing, the second tab 500 is spaced apart from the first tab 400. The second tab 500 is connected to the second electrode plate unit 221. One end of the second tab extends out of the electrode assembly 200 and the housing 100 to form another conductive terminal of the electrochemical device 1. Along the third direction Z, a distance between the second tab 500 and the sixth edge 204 is less than a distance between the second tab and the fifth edge 203. That is, the sixth edge 204 is closer to the second tab 500 than the fifth edge 203. The first tab 400 and the second tab 500 are configured to be electrically connected to an external load to power the load. In this embodiment, the first tab 400 is fixed to the first electrode plate unit 211 by welding, and the second tab 500 is fixed to the second electrode plate unit 221 by welding.

In this embodiment, the insulating tape 300 includes three first connecting portions 320 and three second connecting portions 330. Along the third direction Z, one of the first connecting portions 320 is located between the first tab 400 and the second tab 500, another first connecting portion 320 is located on a side that is of the first tab 400 and that is away from the second tab 500, and the remaining first connecting portion 320 is located on a side that is of the second tab 500 and that is away from the first tab 400. The three second connecting portions 330 are spaced out along the third direction Z. Understandably, even though the insulating tape 300 in this embodiment includes three first connecting portions 320 and three second connecting portions 330 disposed in the foregoing manner, this application is not limited to such configuration. The insulating tape may be configured in any way as long as the insulating tape 300 includes the body portion located on the first surface 201 and at least one first connecting portion 320 extending to the second surface 202.

Figure 6:
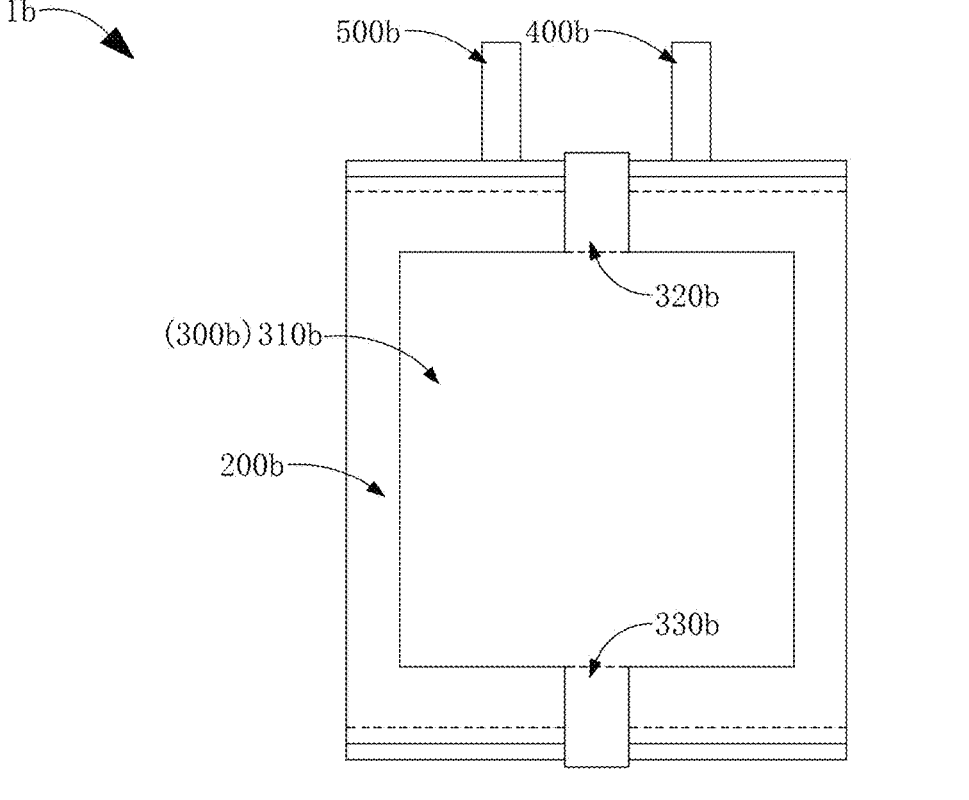
FIG. 6 is a schematic diagram of an electrochemical device with a housing unshown as viewed along a first direction according to another embodiment of this application.

For example, FIG. 6 is a schematic diagram of an electrochemical device 1b with a housing unshown as viewed along a first direction according to another embodiment of this application. The electrochemical device 1b still includes a housing, an electrode assembly 200b, an insulating tape 300b, a first tab 400b, and a second tab 500b. The insulating tape 300b includes a body portion 310b, a first connecting portion 320b, and a second connecting portion 330b. The electrochemical device 1b is identical to the electrochemical device 1 except that the insulating tape 300b includes just one first connecting portion 320b and just one second connecting portion 330b. Optionally, the first connecting portion 320b is disposed between the first tab 400b and the second tab 500b. Understandably, in other embodiments, the first connecting portion 320b may be disposed on a side that is of the first tab 400b and that is away from the second tab 500b, or disposed on a side that is of the second tab 500b and that is away from the first tab 400b.

Figure 7:
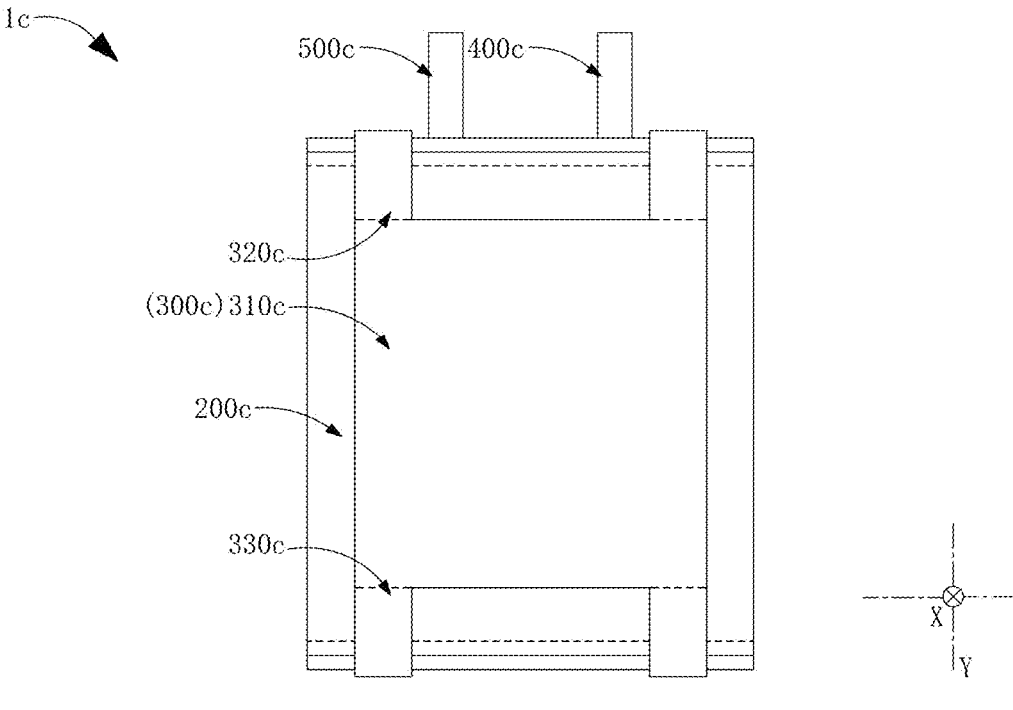
FIG. 7 is a schematic diagram of an electrochemical device with a housing unshown as viewed along a first direction according to another embodiment of this application.

As another example, FIG. 7 is a schematic diagram of an electrochemical device 1c with a housing unshown as viewed along a first direction according to another embodiment of this application. The electrochemical device 1c still includes a housing, an electrode assembly 200c, an insulating tape 300c, a first tab 400c, and a second tab 500c. The insulating tape 300c includes a body portion 310c, a first connecting portion 320c, and a second connecting portion 330c. A main difference between the electrochemical device 1c and the electrochemical device 1 is: the insulating tape 300c includes two first connecting portions 320c and two second connecting portions 330c, one first connecting portion 320c is disposed on a side that is of the first tab 400c and that is away from the second tab 500c, and the other first connecting portion 320c is disposed on a side that is of the second tab 500c and that is away from the first tab 400c.

Figure 8:
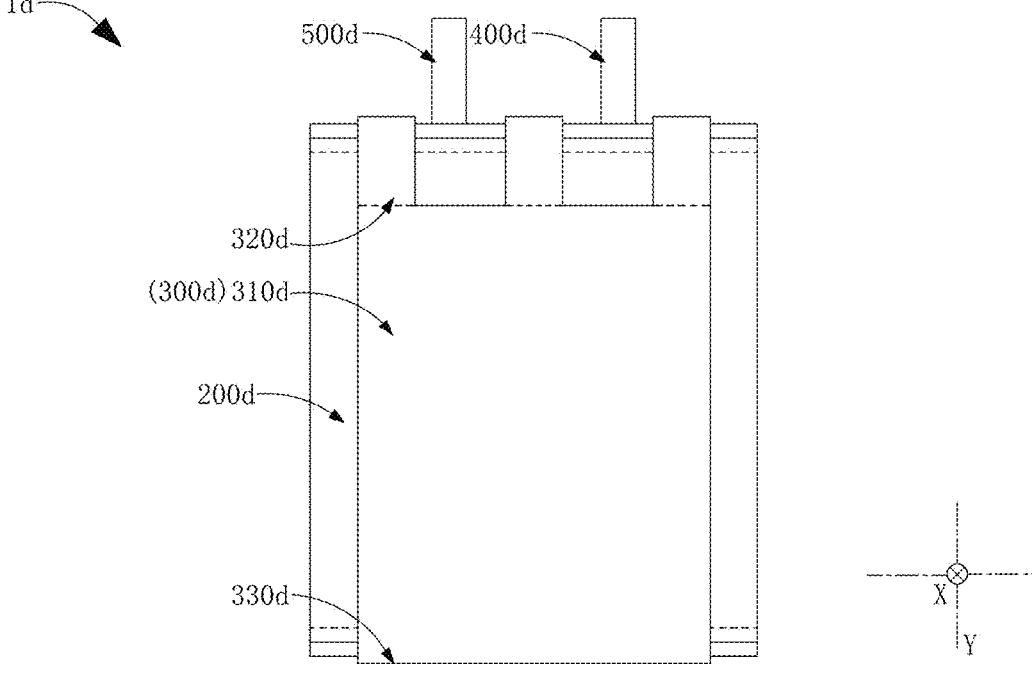
FIG. 8 is a schematic diagram of an electrochemical device with a housing unshown as viewed along a first direction according to another embodiment of this application.

As another example, FIG. 8 is a schematic diagram of an electrochemical device 1d with a housing unshown as viewed along a first direction according to another embodiment of this application. The electrochemical device 1d still includes a housing, an electrode assembly 200d, an insulating tape 300d, a first tab 400d, and a second tab 500d. The insulating tape 300d includes a body portion 310d, a first connecting portion 320d, and a second connecting portion 330d. A main difference between this electrochemical device 1d and the electrochemical device 1 is: in the electrochemical device 1, the width of the second connecting portion 330 along the third direction Z is less than the width of the body portion 310, and the three second connecting portions 330 are spaced out along the third direction Z; by contrast, in the electrochemical device 1d, the width of the second connecting portion 330d along the third direction Z is identical to that of the body portion 310d.

Figure 9:
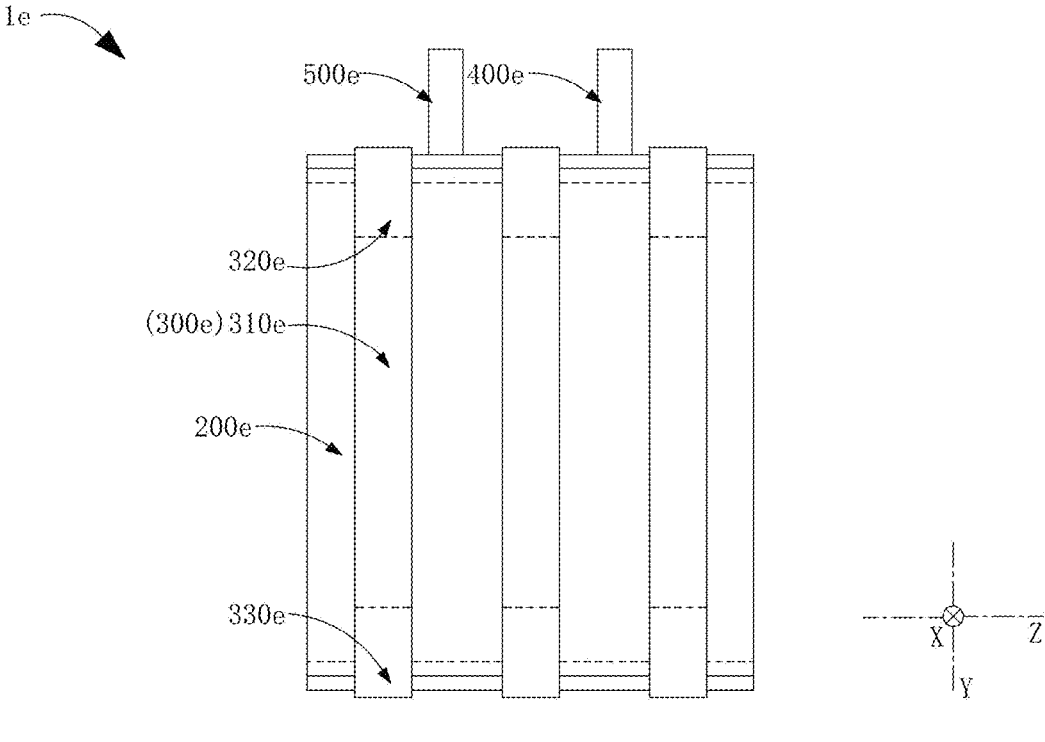
FIG. 9 is a schematic diagram of an electrochemical device with a housing unshown as viewed along a first direction according to another embodiment of this application.

As another example, FIG. 9 is a schematic diagram of an electrochemical device 1e with a housing unshown as viewed along a first direction according to another embodiment of this application. The electrochemical device 1e still includes a housing, an electrode assembly 200e, an insulating tape 300e, a first tab 400e, and a second tab 500e. The insulating tape 300e includes a body portion 310e, a first connecting portion 320e, and a second connecting portion 330e. A main difference between this electrochemical device 1e and the electrochemical device 1 is: in the electrochemical device 1, the width of the body portion 310 along the third direction Z is greater than the width of the first connecting portion 320 and the second connecting portion 330; by contrast, in the electrochemical device 1e, the width of the body portion 310 along the third direction Z is equal to the width of the first connecting portion 320 and the second connecting portion 330. Optionally, the electrochemical device 1e includes three insulating tapes 300e. One insulating tape 300e is located between the first tab 400e and the second tab 500e, another insulating tape 300e is located on a side that is of the first tab 400e and that is away from the second tab 500e, and the remaining insulating tape 300e is located on a side that is of the second tab 500e and that is away from the first tab 400e.

Figure 10:
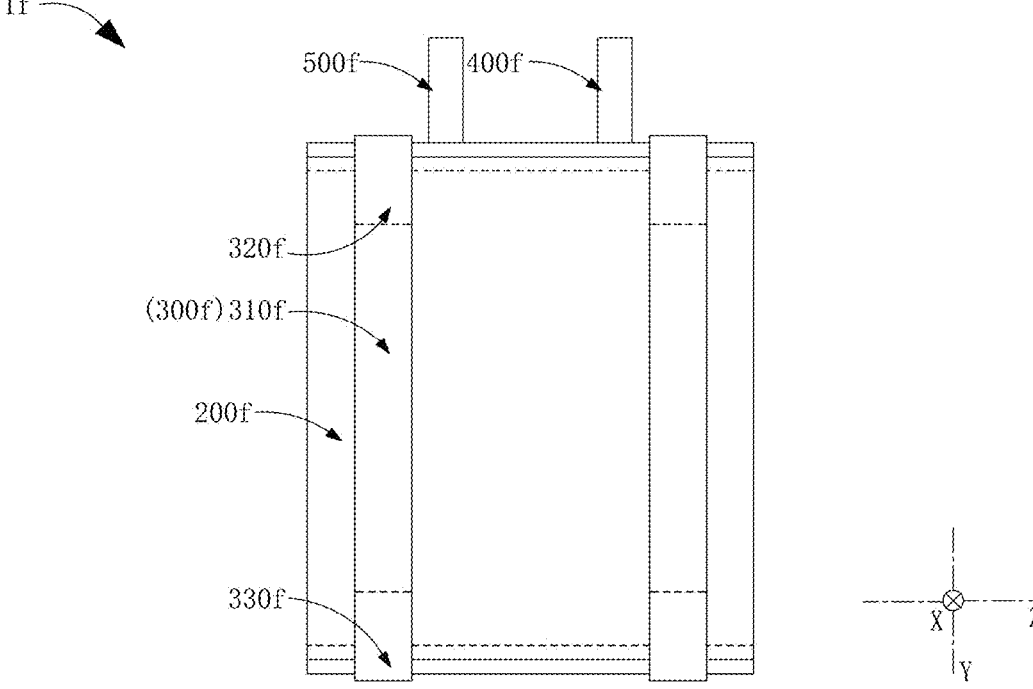
FIG. 10 is a schematic diagram of an electrochemical device with a housing unshown as viewed along a first direction according to another embodiment of this application.

As another example, FIG. 10 is a schematic diagram of an electrochemical device 1f with a housing unshown as viewed along a first direction according to another embodiment of this application. The electrochemical device 1f still includes a housing, an electrode assembly 200f, an insulating tape 300f, a first tab 400f, and a second tab 500f. The insulating tape 300f includes a body portion 310f, a first connecting portion 320f, and a second connecting portion 330f. A main difference between the electrochemical device 1f and the electrochemical device 1e is: the electrochemical device 1e includes three insulating tapes 300e, but the electrochemical device 1f includes two insulating tapes 300f, one insulating tape 300f is located on a side that is of the first tab 400f and that is away from the second tab 500f, and the other insulating tape 300f is located on a side that is of the second tab 500f and that is away from the first tab 400f.

The electrochemical device 1 according to this embodiment of this application includes a housing 100, an electrode assembly 200, and an insulating tape 300. The electrode assembly 200 is accommodated in the housing 100, and includes a first electrode plate unit 211, a second electrode plate unit 221, and a separator unit 231 that are stacked along the first direction X. The first electrode plate unit 211 and the second electrode plate unit 221 that are adjacent to each other are separated by the separator unit 231 in between. The electrode assembly 200 includes a first surface 201 and a second surface 202 that are disposed opposite to each other along the first direction X. The body portion 310 of the insulating tape 300 is disposed on the first surface 201, and is fixedly bonded to the electrode assembly 200 and the housing 100 separately. The first connecting portion 320 of the insulating tape 300 includes a first end 321 and a second end 322 that are opposite to each other. The first end 321 is connected to the body portion 310. The second end 322 is disposed on the second surface 202, and is fixedly bonded to the electrode assembly 200 and the housing 100 separately. The first connecting portion 320 is bonded to an edge of at least one separator unit 231.

In this way, when the edge of the separator unit 231, which is close to the first connecting portion 320, shows a tendency to shrink inward against the first electrode plate unit 211 and the second electrode plate unit 221, the first connecting portion 320 prevents the separator unit 231 from shrinking inward or reduces the degree of inward shrinkage of the separator unit 231 by means of a bonding force between the first connecting portion and the separator unit 231, thereby reducing the risk of short circuits of the electrode assembly 200 in the electrochemical device 1.

Understandably, even though the foregoing embodiment is described by using an example in which the first tab 400 is a single-tab design, this application is not limited to such a design. In other embodiments of this application, the first tab 400 may be a multi-tab design instead. For example, in some embodiments, the first tab 400 includes at least two first conductive portions and a conductive first extension portion. The first electrode plate unit 211 includes a first current collector unit and an active material disposed on the surface of the first current collector unit. Each first conductive portion is formed together with the first current collector unit in one piece. One end of each first conductive portion is connected to the first current collector unit, and the other ends of all the first conductive portions are stacked to form a first collection portion. One end of the first extension portion is connected to the first collection portion, and the other end of the first extension portion extends out of the housing 100. Similarly, the second tab 500 includes at least two second conductive portions and a conductive second extension portion. The second electrode plate unit includes a second current collector unit and an active material disposed on the surface of the second current collector unit. Each second conductive portion is formed together with the second current collector unit in one piece. One end of each second conductive portion is connected to the second current collector unit, and the other ends of all the second conductive portions are stacked to form a second collection portion. One end of the second extension portion is connected to the second collection portion, and the other end of the second extension portion extends out of the housing 100.

The thickness of the first conductive portion in the first tab 400 is the same as that of the first current collector unit. The first conductive portion is relatively thin and relatively sharp at the edge. Therefore, the first conductive portion is prone to movement relative to the electrode assembly 200 and friction against the separator unit 231. The friction may puncture the separator unit 231 and cause a short circuit of the electrode assembly 200. A part of the first connecting portion 320 permeates into the space between adjacent separator units 231 during the preparation, thereby preventing the wobble of the first conductive portion to some extent and reducing the short-circuit risk. Similarly, such settings also prevent the wobble of the second conductive portion to some extent and further reduce the short-circuit risk.

It is hereby noted that the thickness of the active material at the edge part of the first electrode plate 210 and the second electrode plate 220 is smaller than the thickness of the active material at a middle part, which is determined by a surface tension exerted when the active material is applied onto the surface of the first current collector. In this way, the electrode assembly 200 is relatively thin at the edge of the first end portion 240 and the second end portion 250, thereby reducing the effect of contact and fixation between the first electrode plate 210, the second electrode plate 220, and the separator 230, and in turn, increasing the risk of lithium plating of the electrochemical device 1. The first connecting portion 320 and the second connecting portion 330 disposed as mentioned above compensate for the thickness of the electrode assembly 200 at the first end portion 240 and the second end portion 250, improve the effect of contact and fixation between the first electrode plate 210, the second electrode plate 220, and the separator 230, and in turn, reduce the risk of lithium plating.

Understandably, even though the foregoing embodiment is described by using an example in which the electrode assembly 200 is of a jelly-roll structure, this application is not limited to such a structure. In other embodiments of this application, the electrode assembly 200 may be of a stacked structure instead. Specifically, the electrode assembly 200 includes a first electrode plate unit 211, a second electrode plate unit 221, and a separator unit 231. The first electrode plate unit 211 and the second electrode plate unit 221 are of opposite polarities, and are disposed alternately along the first direction X. A separator unit 231 is disposed between the first electrode plate unit 211 and the second electrode plate unit 221 that are adjacent to each other. The electrode assembly 200 includes a first end portion 240 and a second end portion 250 that are disposed opposite to each other along the second direction Y perpendicular to the first direction X. The first tab 400 is disposed at the first end portion 240, and the second tab 500 is disposed at the first end portion 240. In other words, the second direction Y is also a direction defined by connecting one end of the electrode assembly 200 to the other end, where the one end is an end at which the first tab 400 is located, and the other end is away from the first tab 400.

Figure 11:
FIG. 11 is a schematic diagram of an electronic device according to an embodiment of this application.
Figure 11:
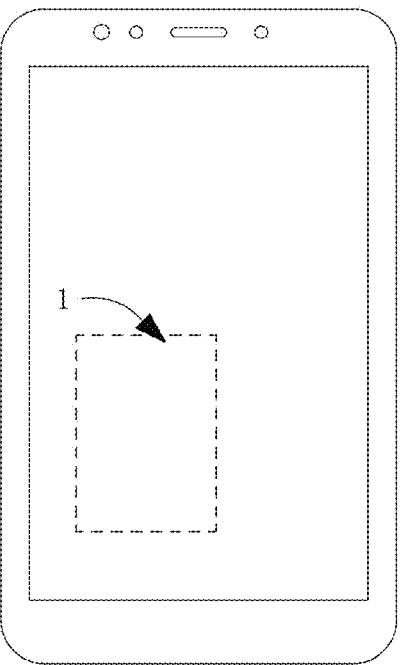

Based on the same inventive concept, this application further provides an electronic device. Referring to FIG. 11, which is a schematic diagram of an electronic device 2 according to an embodiment of this application, with reference to FIG. 1 to FIG. 10, the electronic device includes the electrochemical device 1 (1b, 1c, 1d, 1e, or 1f) according to any one of the foregoing embodiments and a load structure powered by the electrochemical device. In this embodiment, the electronic device 2 includes a mobile phone. Understandably, in other embodiments of this application, the electronic device may be a tablet computer, a computer, an unmanned aerial vehicle, or any other electrically powered devices.

Due to inclusion of the electrochemical device 1, the electronic device can also reduce the risk of short circuits of the electrode assembly 200 in the electronic device.

Finally, it is hereby noted that the foregoing embodiments are merely intended to describe the technical solutions of this application but not to limit this application. Based on the concept of this application, the technical features in the foregoing embodiments or different embodiments may be combined, the steps may be implemented in any order, and many variations may be made to this application in different aspects, which, for brevity, are not provided in detail. Although this application has been described in detail with reference to the foregoing embodiments, a person of ordinary skill in the art understands that modifications may still be made to the technical solutions described in the foregoing embodiments, or equivalent replacements may still be made to some technical features in the technical solutions. Such modifications and replacements do not make the essence of the corresponding technical solutions depart from the scope of the technical solutions of the embodiments of this application.

What is claimed is:

1. An electrochemical device, comprising:

a housing, an electrode assembly accommodated in the housing, and an insulating tape;

wherein the electrode assembly comprises:

a first electrode plate, a second electrode plate, and a separator stacked along a first direction, wherein the separator is disposed between the first electrode plate and the second electrode plate;

wherein the electrode assembly comprises:

a first surface and a second surface disposed opposite to each other along the first direction;

wherein the insulating tape comprises:

a body portion disposed on the first surface and fixedly bonded to the electrode assembly and the housing separately, and a first connecting portion formed together with the body portion in one piece;

wherein the first connecting portion comprises:

a first end and a second end opposite to each other, wherein the first end is connected to the body portion, the second end is disposed on the second surface, the second end is fixedly bonded to the electrode assembly and the housing separately, and the first connecting portion is bonded to an edge of the separator; and wherein the first direction is a direction parallel to a thickness direction of the electrochemical device and oriented toward the second surface from the first surface;

wherein the electrochemical device further comprises a first tab connected to the first electrode plate;

the electrode assembly comprises a first end portion and a second end portion opposite to each other along a second direction, the first tab is disposed at the first end portion and extends outward from the first end portion along the second direction, and the second direction is perpendicular to the first direction; and when viewed along a direction opposite to the first direction, the first electrode plate comprises a first edge and a second edge disposed opposite to each other along the second direction, the first edge is located at the first end portion, the second electrode plate comprises a third edge and a fourth edge disposed opposite to each other along the second direction, and the third edge is located at the first end portion; and an end of the first connecting portion facing away from the body portion comprises a fifth end edge aligned with the first edge, the first connecting portion extends from the first end on the first surface, along the first end portion, to the fifth end edge on the second surface of the electrode assembly;

a distance between a midpoint of the fifth end edge and the first edge, measured along the second direction, is $L_{51}$, a distance between the midpoint of the fifth end edge and the third edge, measured along the second direction, is $L_{52}$, and $\max(L_{51}, L_{52}) \geq 3$ mm, wherein $\max(L_{51}, L_{52})$ represents the greater value between $L_{51}$ and $L_{52}$.

2. The electrochemical device according to claim 1, wherein the edge of the separator facing the first connecting portion, is bonded to the first connecting portion.

3. The electrochemical device according to claim 1, wherein along the second direction, the separator extends beyond the first electrode plate and the second electrode plate; and the first tab comprises:

at least two first conductive portions, wherein the first electrode plate comprises a first current collector, the at least two first conductive portions are formed together with the first current collector in one piece, one end of each of the first conductive portions is connected to the first current collector, and the other ends of all the first conductive portions are stacked to form a first collection portion; and a conductive first extension portion, wherein one end of the first extension portion is connected to the first collection portion, and the other end of the first extension portion extends out of the housing.

4. The electrochemical device according to claim 1, further comprising a second tab connected to the second electrode plate, and the second tab is disposed at the first end portion;

wherein a third direction is perpendicular to the first direction and the second direction;

the electrochemical device satisfies at least one of the following conditions:

a) along the third direction, the first connecting portion is disposed between the first tab and the second tab;

b) along the third direction, the first connecting portion is disposed on a side of the first tab, the side of the first tab being facing away from the second tab; and c) along the third direction, the first connecting portion is disposed on a side of the second tab, the side of the second tab being facing away from the first tab.

5. The electrochemical device according to claim 1, wherein the electrode assembly is formed by winding the first electrode plate, the separator and the second electrode plate;

the first electrode plate comprises a plurality of first electrode plate units and a plurality of first connecting units; viewed along the second direction, the plurality of first electrode plate units extend along a third direction, and all the first electrode plate units are arranged along the first direction; and, along a winding direction of the electrode assembly, each of the first connecting units connects two adjacent first electrode plate units;

the second electrode plate comprises a plurality of second electrode plate units and a plurality of second connecting units; viewed along the second direction, the plurality of second electrode plate units extend along the third direction, and all the second electrode plate units are arranged along the first direction; and, along the winding direction of the electrode assembly, each of the second connecting units connects two adjacent second electrode plate units;

the separator comprises a plurality of separator units and a plurality of third connecting units; viewed along the second direction, the plurality of separator units extend along the third direction, and all the separator units are arranged along the first direction; and, along the winding direction of the electrode assembly, each of the third connecting units connects two adjacent separator units; and the third direction is perpendicular to the first direction and the second direction.

6. The electrochemical device according to claim 1, wherein viewed along the first direction, the electrochemical device satisfies at least one of the following conditions:

d) an end of the body portion closest to the first end portion comprises a first side located on the first surface, the first side is located on a side of the first edge and the third edge towards the second edge, a distance between a midpoint of the first side and the first edge, measured along the second direction, is $L_{11}$, a distance between the midpoint of the first side and the third edge, measured along the second direction, is $L_{12}$, and $\max(L_{11}, L_{12}) \geq 3$ mm, wherein $\max(L_{11}, L_{12})$ represents the greater value between $L_{11}$ and $L_{12}$; and e) an end of the body portion disposed towards the second end portion comprises a second side located on the first surface, the second side is located on a side of the second edge and the fourth edge toward the first edge, a distance between a midpoint of the second side and the second edge, measured along the second direction, is $L_{21}$, a distance between the midpoint of the second side and the fourth edge, measured along the second direction, is $L_{22}$, and $\max(L_{21}, L_{22}) \geq 3$ mm, wherein $\max(L_{21}, L_{22})$ represents the greater value between $L_{21}$ and $L_{22}$.

7. The electrochemical device according to claim 1, wherein viewed along the first direction, an edge profile of the electrode assembly comprises a fifth edge and a sixth edge disposed opposite to each other along a third direction, the fifth edge is closer to the first tab than the sixth edge along the third direction, and the third direction is perpendicular to the first direction and the second direction; and the electrochemical device satisfies at least one of the following conditions:

f) an end of the body portion disposed towards the fifth edge comprises a third side located on the first surface, a distance between a midpoint of the third side and the fifth edge, measured along the third direction, is $L_{33}$, and $L_{33}$ is greater than or equal to 3 mm; and g) an end of the body portion disposed towards the sixth edge comprises a fourth side located on the first surface, a distance between a midpoint of the fourth side and the sixth edge, measured along the third direction, is $L_{44}$, and $L_{44}$ is greater than or equal to 3 mm.

8. The electrochemical device according to claim 1, wherein, the insulating tape further comprises a second connecting portion formed together with the body portion in one piece;

the second connecting portion comprises a third end and a fourth end opposite to each other, the third end is connected to the body portion, the fourth end is disposed on the second surface, the fourth end is fixedly bonded to the electrode assembly and the housing separately, and the second connecting portion is bonded to the edge of the separator; and the second connecting portion extends from the third end on the first surface, along the second end portion, to the fourth end on the second surface.

9. The electrochemical device according to claim 1, wherein the insulating tape comprises a plurality of second connecting portions formed together with the body portion in one piece, and the second connecting portions are spaced apart along a third direction;

each second connecting portion comprises a third end and a fourth end opposite to each other, the third end is connected to the body portion, the fourth end is disposed on the second surface, the fourth end is fixedly bonded to the electrode assembly and the housing separately, and each second connecting portion is bonded to the edge of the separator; and each second connecting portion extends from the third end on the first surface, along the second end portion, to the fourth end on the second surface; and the third direction is perpendicular to the first direction and the second direction.

10. The electrochemical device according to claim 1, wherein the insulating tape comprises an adhesive, wherein the adhesive is configured to melt when a temperature is higher than a preset threshold, so as to be bonded to the electrode assembly.

11. The electrochemical device according to claim 1, wherein the insulating tape comprises:

a substrate layer;

a first material layer disposed on a first side of the substrate layer, the first side of the substrate layer being oriented toward the electrode assembly, and the first material layer is configured to melt when a temperature is higher than a first preset threshold, so as to be bonded to the electrode assembly; and a second material layer disposed on a second side of the substrate layer, the second side of the substrate layer being oriented away from the electrode assembly, and the second material layer is configured to melt when the temperature is higher than a second preset threshold, so as to be bonded to the housing.

12. The electrochemical device according to claim 11, wherein at least a part of the first connecting portion is interposed between two adjacent separator units to fixedly bond the two adjacent separator units.

13. An electronic device comprising:

an electrochemical device, the electrochemical device, comprising:

a housing, an electrode assembly accommodated in the housing, and an insulating tape;

wherein the electrode assembly comprises:

a first electrode plate, a second electrode plate, and a separator stacked along a first direction, wherein the separator is disposed between the first electrode plate and the second electrode plate;

wherein the electrode assembly comprises:

a first surface and a second surface disposed opposite to each other along the first direction;

wherein the insulating tape comprises:

a body portion disposed on the first surface and fixedly bonded to the electrode assembly and the housing separately; and a first connecting portion formed together with the body portion in one piece;

wherein the first connecting portion comprises:

a first end and a second end opposite to each other, wherein the first end is connected to the body portion, the second end is disposed on the second surface, the second end is fixedly bonded to the electrode assembly and the housing separately, and the first connecting portion is bonded to an edge of the separator; and wherein the first direction is a direction parallel to a thickness direction of the electrochemical device and oriented toward the second surface from the first surface;

wherein the electrochemical device further comprises a first tab connected to the first electrode plate;

the electrode assembly comprises a first end portion and a second end portion opposite to each other along a second direction, the first tab is disposed at the first end portion and extends outward from the first end portion along the second direction, and the second direction is perpendicular to the first direction; and when viewed along a direction opposite to the first direction, the first electrode plate comprises a first edge and a second edge disposed opposite to each other along the second direction, the first edge is located at the first end portion, the second electrode plate comprises a third edge and a fourth edge disposed opposite to each other along the second direction, and the third edge is located at the first end portion; and an end of the first connecting portion facing away from the body portion comprises a fifth end edge aligned with the first edge, the first connecting portion extends from the first end on the first surface, along the first end portion, to the fifth end edge on the second surface of the electrode assembly;

a distance between a midpoint of the fifth end edge and the first edge, measured along the second direction, is $L_{51}$, a distance between the midpoint of the fifth end edge and the third edge, measured along the second direction, is $L_{52}$, and $\max(L_{51}, L_{52}) \geq 3$ mm, wherein $\max(L_{51}, L_{52})$ represents the greater value between $L_{51}$ and $L_{52}$.

14. The electronic device according to claim 13, wherein the edge of the separator facing the first connecting portion, is bonded to the first connecting portion.

15. The electronic device according to claim 13, wherein the electrochemical device further comprises a second tab connected to the second electrode plate unit, and the second tab is disposed at the first end portion;

wherein a third direction is perpendicular to the first direction and the second direction;

the electrochemical device satisfies at least one of the following conditions:

a) along the third direction, the first connecting portion is disposed between the first tab and the second tab;

b) along the third direction, the first connecting portion is disposed on a side of the first tab, the side of the first tab being facing away from the second tab; and c) along the third direction, the first connecting portion is disposed on a side of the second tab, the side of the second tab being facing away from the first tab.

16. The electronic device according to claim 13, wherein viewed along the first direction, the electrochemical device satisfies at least one of the following conditions:

d) an end of the body portion closest to the first end portion comprises a first side located on the first surface, the first side is located on a side of the first edge and the third edge toward the second edge, a distance between a midpoint of the first side and the first edge, measured along the second direction, is $L_{11}$, a distance between the midpoint of the first side and the third edge, measured along the second direction, is $L_{12}$, and $\max(L_{11}, L_{12}) \geq 3$ mm, wherein $\max(L_{11}, L_{12})$ represents the greater value between $L_{11}$ and $L_{12}$; and e) an end of the body portion disposed towards the second end portion comprises a second side located on the first surface, the second side is located on a side of the second edge and the fourth edge toward the first edge, a distance between a midpoint of the second side and the second edge, measured along the second direction, is $L_{21}$, a distance between the midpoint of the second side and the fourth edge, measured along the second direction, is $L_{22}$, and $\max(L_{21}, L_{22}) \geq 3$ mm, wherein $\max(L_{21}, L_{22})$ represents the greater value between $L_{21}$ and $L_{22}$.

17. The electronic device according to claim 13, wherein viewed along the first direction, an edge profile of the electrode assembly comprises a fifth edge and a sixth edge disposed opposite to each other along a third direction, the fifth edge is closer to the first tab than the sixth edge along the third direction, and the third direction is perpendicular to the first direction and the second direction; and the electrochemical device satisfies at least one of the following conditions:

f) an end of the body portion disposed towards the fifth edge comprises a third side located on the first surface, a distance between a midpoint of the third side and the fifth edge, measured along the third direction, is $L_{33}$, and $L_{33}$ is greater than or equal to 3 mm; and g) an end of the body portion disposed towards the sixth edge comprises a fourth side located on the first surface, a distance between a midpoint of the fourth side and the sixth edge, measured along the third direction, is $L_{44}$, and $L_{44}$ is greater than or equal to 3 mm.

* * * * *